(12) United States Patent
Xu

(10) Patent No.: US 9,862,449 B2
(45) Date of Patent: Jan. 9, 2018

(54) POSITIONING DEVICE FOR A FOLDABLE SCOOTER

(71) Applicant: ZheJiang JinBang Sports Equipment Co., Ltd., Lishui, Zhejiang (CN)

(72) Inventor: Yongqiang Xu, Hangzhou, Zhejiang (CN)

(73) Assignee: ZheJiang JinBang Sports Equipment Co., Ltd. (CN)

(*) Notice: Subject to any disclaimer, the term of this patent is extended or adjusted under 35 U.S.C. 154(b) by 0 days.

(21) Appl. No.: 14/551,048

(22) Filed: Nov. 23, 2014

(65) Prior Publication Data

US 2016/0368558 A1    Dec. 22, 2016

(30) Foreign Application Priority Data

Oct. 11, 2014  (CN) .......................... 2014 2 0588672

(51) Int. Cl.
| | |
|---|---|
| *B62K 19/18* | (2006.01) |
| *B62K 3/00* | (2006.01) |
| *B62K 15/00* | (2006.01) |
| *B62K 21/02* | (2006.01) |

(52) U.S. Cl.
CPC .............. *B62K 19/18* (2013.01); *B62K 3/002* (2013.01); *B62K 15/006* (2013.01); *B62K 21/02* (2013.01)

(58) Field of Classification Search
CPC .............................. B62K 3/002; B62K 15/006
See application file for complete search history.

(56) References Cited

U.S. PATENT DOCUMENTS

| | | | | |
|---|---|---|---|---|
| 6,173,976 | B1 * | 1/2001 | Lee ........................ | B62K 3/002 280/87.041 |
| 6,179,307 | B1 * | 1/2001 | Mao ....................... | B62K 3/002 280/244 |
| 6,206,387 | B1 * | 3/2001 | Tsai ....................... | B62K 3/002 16/359 |
| 6,234,501 | B1 * | 5/2001 | Chen ...................... | C23F 1/46 16/900 |
| 6,260,866 | B1 * | 7/2001 | Cheng ................... | B62K 15/006 280/87.041 |
| 6,270,095 | B1 * | 8/2001 | Chang ................... | B62K 15/006 280/87.041 |
| 6,276,701 | B1 * | 8/2001 | Chen ..................... | B62K 15/006 280/87.05 |
| 6,332,621 | B1 * | 12/2001 | Wu ........................ | B62K 3/002 16/900 |
| 6,378,880 | B1 * | 4/2002 | Lin ........................ | B62K 3/002 280/87.041 |
| 6,390,483 | B1 * | 5/2002 | Hsu ........................ | B23B 31/02 279/102 |

(Continued)

*Primary Examiner* — Katy M Ebner

(57) ABSTRACT

A positioning device for a foldable scooter, the positioning device comprising a frame component; a inclined tube component, coupled to the frame component; a front fork component, coupled to the inclined tube component; a handlebar, coupled to the front fork component; and two purfles, coupled to the frame component; wherein each purfle further comprises a limit groove, wherein a locating pin is connected to the limit groove and connected to a button, wherein the button is removably connected to the inclined tube component through a spring, wherein the inclined tube component is removably connected to the purfles through a fast unloaded component.

4 Claims, 6 Drawing Sheets

(56) References Cited

U.S. PATENT DOCUMENTS

| | | | | |
|---|---|---|---|---|
| 6,428,021 | B1* | 8/2002 | Tung | B62K 3/002 280/87.041 |
| 6,481,913 | B2* | 11/2002 | Chen | B62K 3/002 16/900 |
| 6,491,312 | B2* | 12/2002 | Reynolds | B62K 3/002 280/272 |
| 6,531,838 | B2* | 3/2003 | Parks | B62K 3/002 180/221 |
| 6,832,660 | B2* | 12/2004 | Dodd | B62M 13/00 180/220 |
| 7,011,319 | B2* | 3/2006 | Lu | B62K 15/006 280/87.041 |
| 7,156,405 | B1* | 1/2007 | Ming | B62K 15/00 280/278 |
| 7,407,172 | B2* | 8/2008 | Ka Ming | B62K 3/002 280/87.041 |
| 7,419,171 | B1* | 9/2008 | Ka Ming | B62K 3/002 280/87.041 |
| 7,954,831 | B1* | 6/2011 | Yeh | B62K 3/002 16/429 |
| 8,500,147 | B2* | 8/2013 | Johnson | B62K 3/002 280/87.021 |
| 9,027,944 | B2* | 5/2015 | Johnson | B62K 3/002 280/87.041 |

* cited by examiner

POSITIONING DEVICE FOR A FOLDABLE SCOOTER

CROSS-REFERENCE TO RELATED APPLICATIONS

The present application claims priority based on Chinese Application No. 201420588672.4 filed Oct. 11, 2014, the disclosure of which is hereby incorporated by reference in its entirety.

TECHNICAL FIELD

The present application relates to a positioning device for a foldable scooter.

BACKGROUND

In the present market, most scooters have a simple structure in which a frame is fixed to a handle bar through an inclined tube component. This kind of scooters cannot be folded, and are not convenient for storage with its large frame and has no flexibility to be moved.

SUMMARY

The present application is directed to a positioning device for a foldable scooter which enables the scooter be folded for easy storage easy to store.

An embodiment of the present application for a position device for a foldable scooter can comprise a frame component; a inclined tube component, coupled to the frame component; a front fork component, coupled to the inclined tube component; a handlebar, coupled to the front fork component; and two purfles, coupled to the frame component; wherein each purfle further comprises a limit groove, wherein a locating pin is connected to the limit groove and connected to a button, wherein the button is removably connected to the inclined tube component through a spring, wherein the inclined tube component is removably connected to the purfles through a fast unloaded component.

The fast unloaded component can comprise a lock screw, a self-tapping screw and a fixed pin, wherein the lock screw, the self-tapping screw and the fixed pin are inter-connected through pin holes set correspondingly on the purfles.

A plastic gasket is disposed between the purfles and the inclined tube component, and wherein the plastic gasket further comprises a long groove corresponding to the limit groove.

A front wheel coupled to the front fork component, and a back wheel coupled to the frame component.

A protective cover is positioned on the outer surfaced of the purfles and on the top of the frame component.

It is to be understood that both the foregoing general description and the following detailed description are exemplary only and are not necessarily restrictive of the disclosure as claimed. The accompanying drawings, which are incorporated in and constitute a part of the specification, illustrate an embodiment of the disclosure and together with the general description, serve to explain the principle of the disclosure.

BRIEF DESCRIPTION OF THE DRAWINGS

Further features and advantages of the present device, as well as the structure and operation of various embodiments of the present device, will become apparent and more readily appreciated from the following description or the preferred embodiments, taken in conjunction with the accompanying drawing of which.

DETAILED DESCRIPTION

In the following detailed description, reference is made to the accompanying drawings that form a part hereof, and in which is shown by way of illustration specific implementations that may be practiced. These implementations are described in sufficient detail to enable those skilled in the art to practice the implementations, and it is to be understood that other implementations may be utilized and that logical, mechanical, electrical and other changes may be made without departing from the scope of the implementation. The following detailed description is, therefore, not to be taken in a limiting sense.

Figure 1:
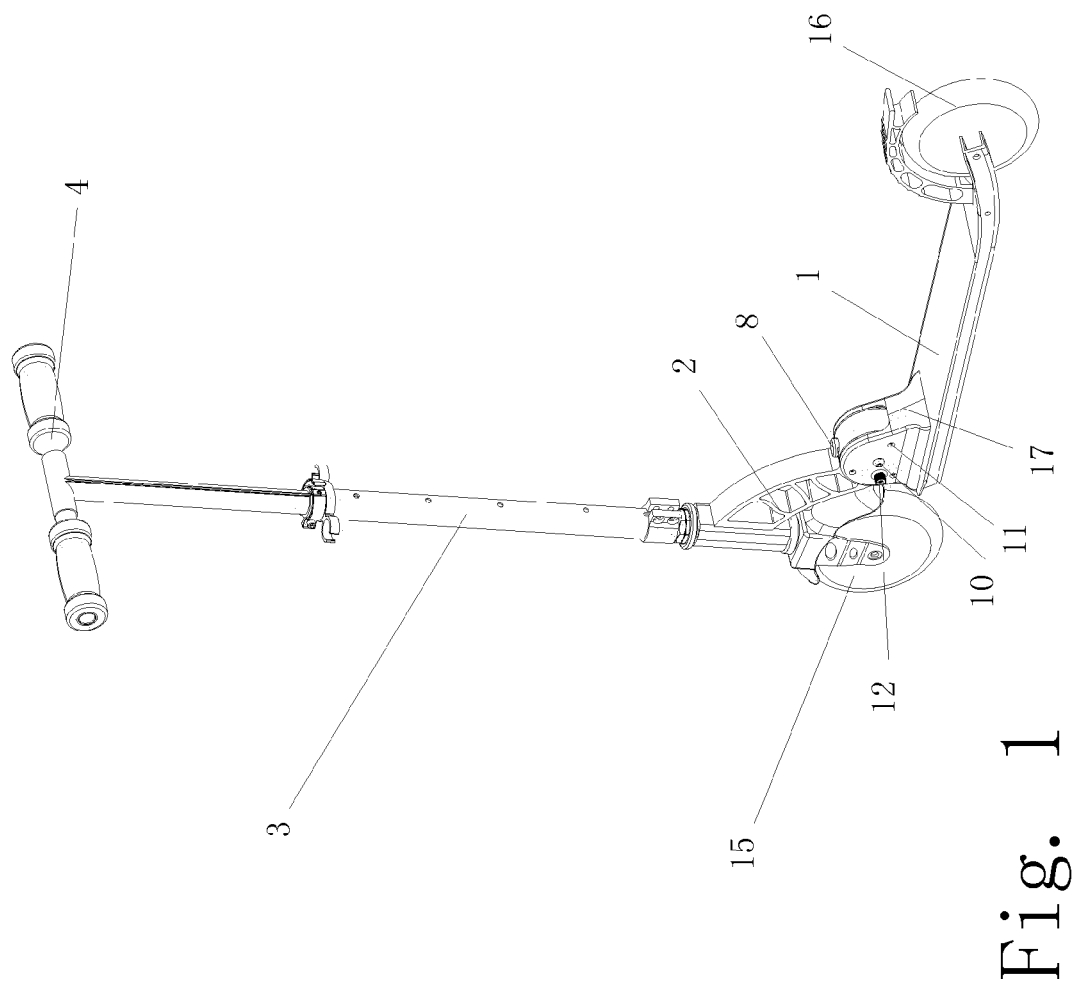
FIG. 1 is a structure schematic of a positioning device for a foldable scooter.
Figure 2:
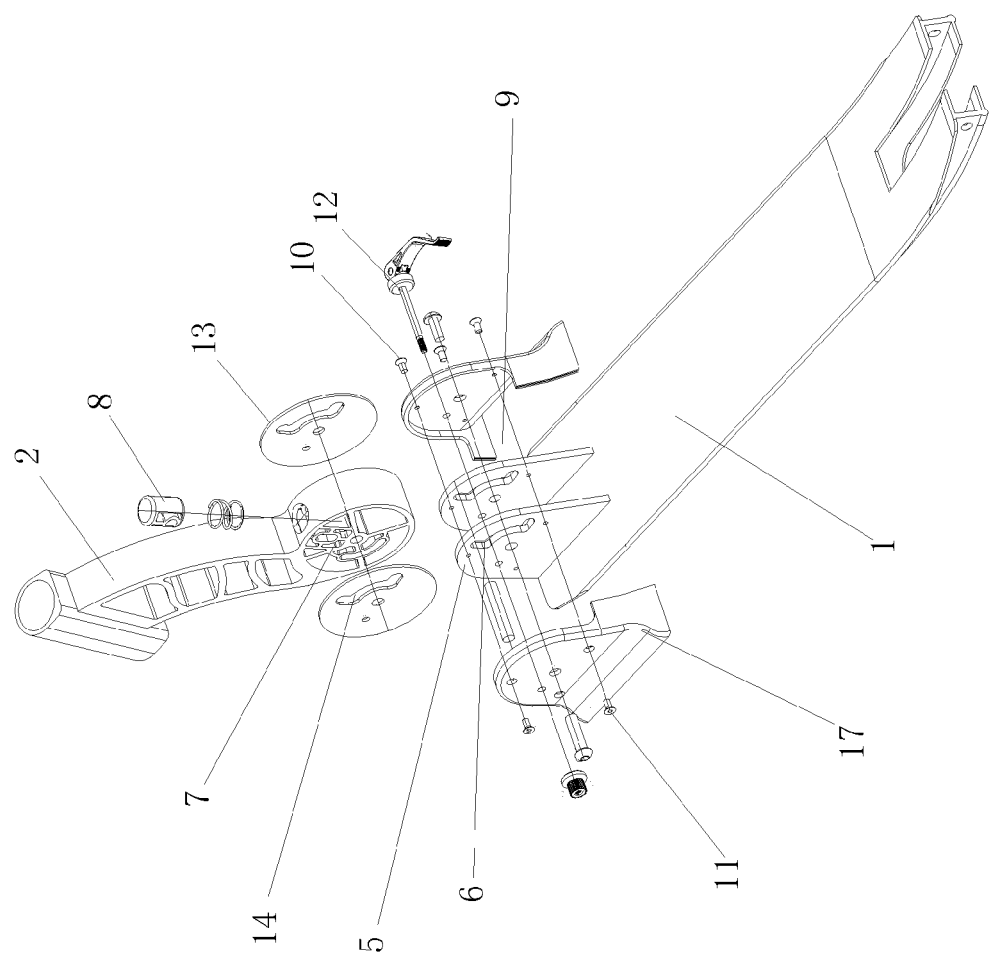
FIG. 2 is an exploded structure schematic of a positioning device for a foldable scooter.
Figure 3:
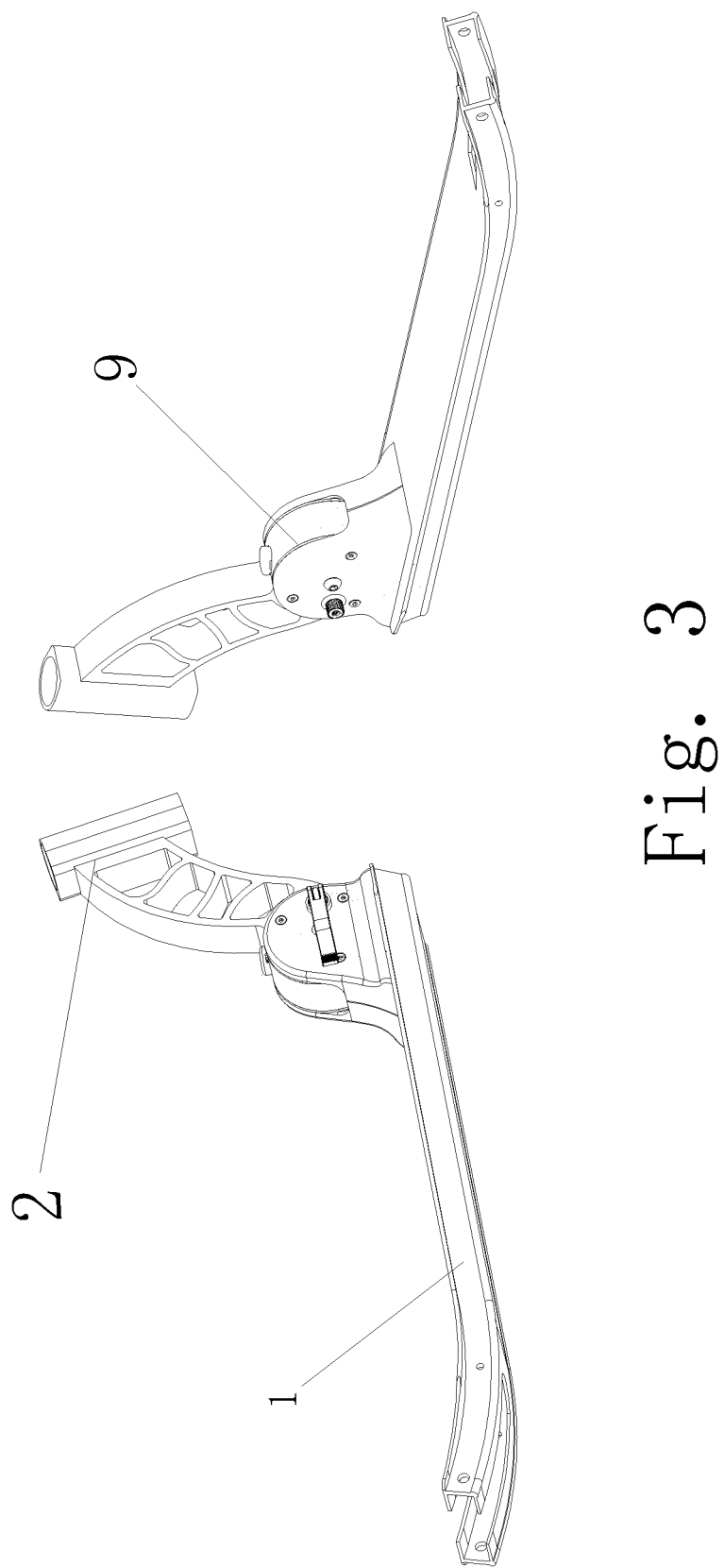
FIG. 3 is a schematic of some parts of the positioning device for a foldable scooter.
Figure 4:
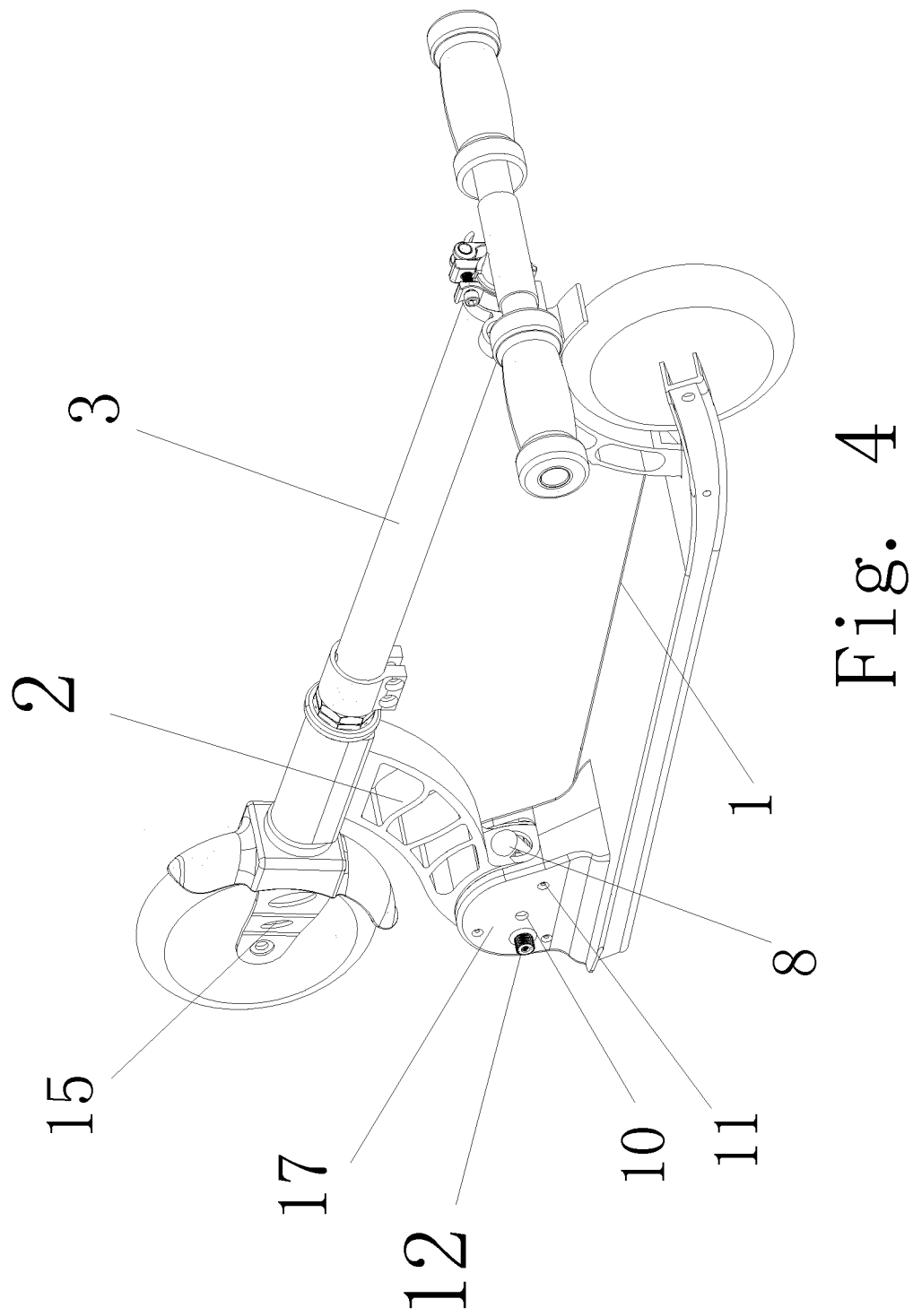
FIG. 4 is a scooter comprising the positioning device for a foldable scooter wherein the scooted is in folded position.
Figure 5:
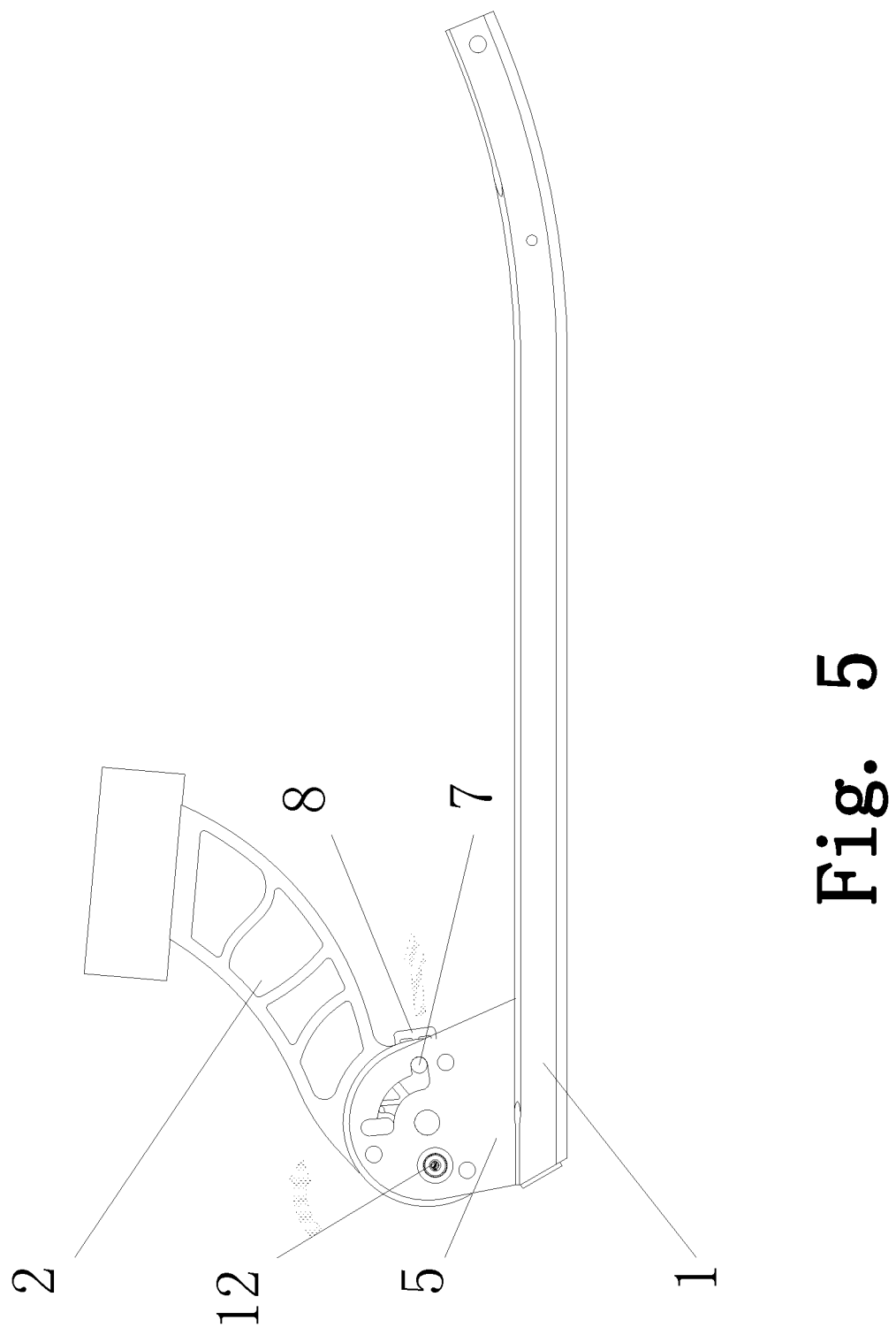
FIG. 5 is a side view of the frame component and the inclined tube component.
Figure 6:
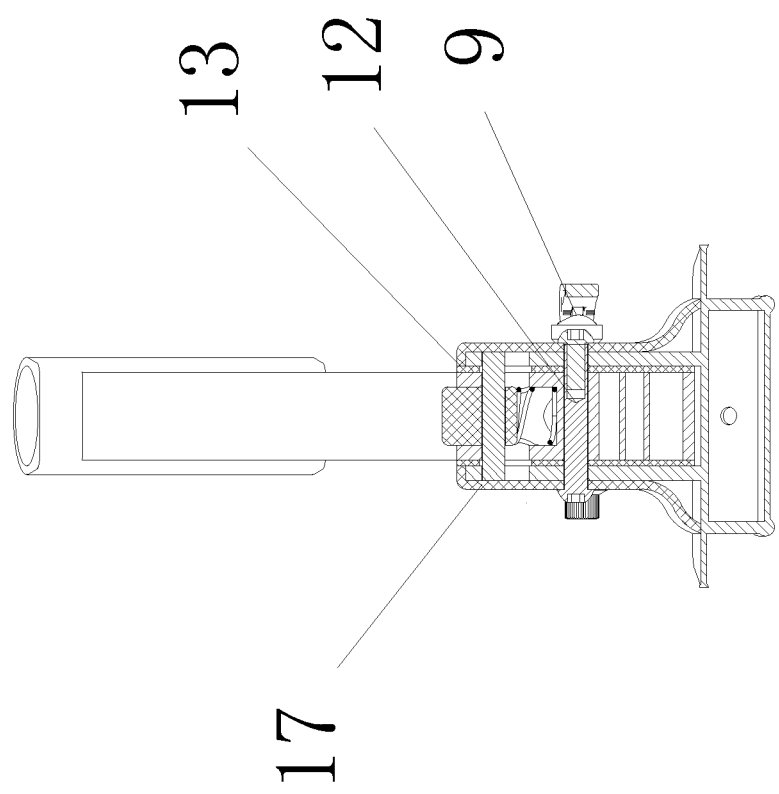
FIG. 6 is another side view of the frame component and the inclined tube component of the positioning device.

Referring to FIG. 1 to FIG. 2, present application discloses a positioning device for a foldable scooter, which includes a frame component 1, a inclined tube component 2 coupled to the frame component 1, a front fork component 3 couple to the inclined tube component 2, a handlebar 4 coupled to the front fork component 3, two purfles 5 coupled to the frame component 1, the positioning purfles 5 each can further comprise a limit groove 6, a locating pin 7 is connected to the limit groove 6 and the locating pin 7 is connected to the button 8, the button 8 is removably connected to the inclined tube component 2 through a spring, the inclined tube component 2 is removably connected to the purfles 5 through the fast unloaded component 9.

In addition, referring to FIG. 2, in one embodiment, the fast unloaded component 9 includes a lock screw 10, a self-tapping screw 11 and a fixed pin 12, the lock screw 10, self-tapping screw 11 and fixed pin 12 are connected each other with the pin hole correspondingly set on the purfles 5.

Continuing to refer to FIG. 2, in one embodiment, a plastic gasket 13 is disposed between the purfles 5 and the inclined tube component 2, the plastic gasket further comprise a long groove 14 corresponding with the limit groove 6.

And a front wheel 15 is set on the front fork component 3, a back wheel 16 is set on the frame comp Moreover, a protective cover 17 is positioned on the outer end of the purfles 5 and the protective cover 17 is disposed on the frame component 1.

When the user needs to fold the scooter, the user presses the button 8, the locating pin 7 that been set on the limit groove 6 can move on the limit groove 6, and at the two ends of the limit groove 6, there is a projection that can stuck the locating pin 7, adjust the position of the locating pins, then the scooter can be folded.

What is claimed is:

1. A positioning device for a foldable scooter, the positioning device comprising:

a frame component;

a inclined tube component, coupled to the frame component;

a front fork component, coupled to the inclined tube component;

a handlebar, coupled to the front fork component;

two purfles, coupled to the frame component; and two plastic gasket each corresponding to a side of the inclined tube component;

wherein each plastic gasket further comprises a long groove and a limit groove located at each end of the long groove; wherein each purfle further comprises a long groove and a limit groove at each end of the long groove, wherein each plastic gasket is disposed between a side of the inclined tube component and a purfle, wherein the limit grooves and the long groove on each plastic gasket matches with the limit grooves and long groove on each corresponding purfle, wherein a spring and a button are removably connected to the inclined tube component; wherein a locating pin is connected to the limit grooves on the purfles, the limit grooves on the plastic gaskets, and a through hole on the button, wherein the spring provide tensile force so that the locating pin is locked into the limit grooves; wherein pushing the button compresses the spring which causes the locating pin to move into the long grooves, wherein the inclined tube component is removably connected to the purfles through a fast unloaded component.

2. The positioning device as described in claim 1, wherein the fast unloaded component further comprises a lock screw, a self-tapping screw and a fixed pin, wherein the lock screw, the self-tapping screw and fixed pin are inter-connected through pin holes correspondingly coupled to the purfles.

3. The positioning device as described in claim 2, wherein a front wheel is coupled to the front fork component, a back wheel is coupled to the frame component.

4. The positioning device as described in claim 3, wherein a protective cover is positioned on the outer surface of the purfles and on the top of the frame component.

* * * * *